United States Patent [19]
Hood et al.

[11] Patent Number: 5,071,206
[45] Date of Patent: * Dec. 10, 1991

[54] COLOR-CORRECTED HEAT-REFLECTING COMPOSITE FILMS AND GLAZING PRODUCTS CONTAINING THE SAME

[75] Inventors: Thomas G. Hood, San Francisco; Stephen F. Meyer, Los Altos; Michael Brazil, Union City, all of Calif.

[73] Assignee: Southwall Technologies Inc., Palo Alto, Calif.

[*] Notice: The portion of the term of this patent subsequent to Jan. 24, 2006 has been disclaimed.

[21] Appl. No.: 198,782

[22] Filed: May 25, 1988

Related U.S. Application Data

[63] Continuation-in-part of Ser. No. 880,797, Jun. 30, 1986, Pat. No. 4,799,745.

[51] Int. Cl.$^5$ .......................... G02B 5/28; C23C 14/14; C23C 14/34
[52] U.S. Cl. ................................ 359/360; 204/192.27
[58] Field of Search ....................... 350/1.7; 204/192.27

[56] References Cited

U.S. PATENT DOCUMENTS

| | | |
|---|---|---|
| 3,272,986 | 9/1966 | Schmidt . |
| 3,682,528 | 8/1972 | Apfel et al. .......................... 350/166 |
| 3,900,673 | 8/1975 | Mattimoe et al. .................... 428/339 |
| 3,990,784 | 11/1976 | Gelber . |
| 4,179,181 | 12/1979 | Chang . |
| 4,204,942 | 5/1980 | Chahroodi .......................... 204/298 |
| 4,335,166 | 6/1982 | Lizardo et al. ...................... 428/34 |
| 4,337,990 | 7/1982 | Fan et al. ............................ 350/1.7 |
| 4,590,118 | 5/1986 | Yatabe . |
| 4,859,532 | 8/1989 | Oyama . |

FOREIGN PATENT DOCUMENTS

| | | |
|---|---|---|
| 0031278 | 7/1981 | European Pat. Off. . |
| 0080182 | 6/1983 | European Pat. Off. . |

*Primary Examiner*—Bruce Y. Arnold
*Attorney, Agent, or Firm*—Irell & Manella

[57] ABSTRACT

Visually transparent, color corrected, infra-red reflecting films are disclosed for solar heat control. The films employ Fabry-Perot sandwich interference filters which are characterized by having three or more transparent layers of sputter-deposited metal such as silver directly contiguous with dielectric spacer layers and optionally boundary layers. Methods for producing these materials by sputtering techniques as well as glazing materials incorporating these films are disclosed, as well.

12 Claims, 7 Drawing Sheets

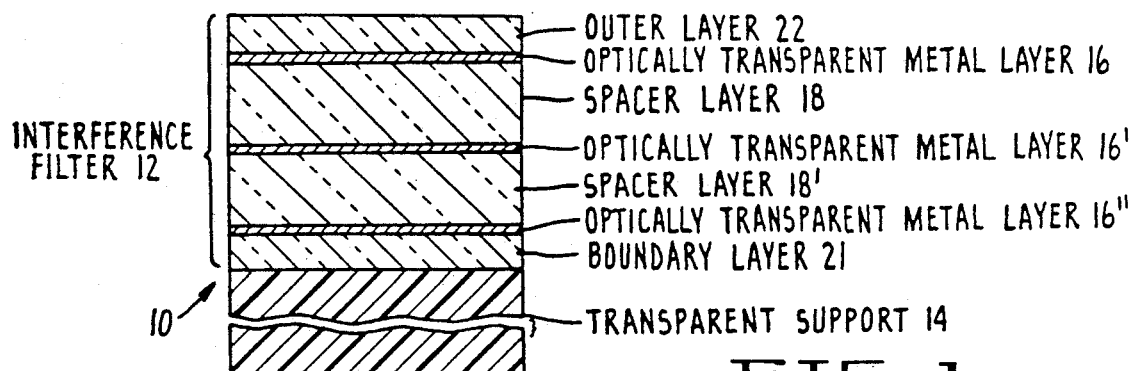
FIG_1.
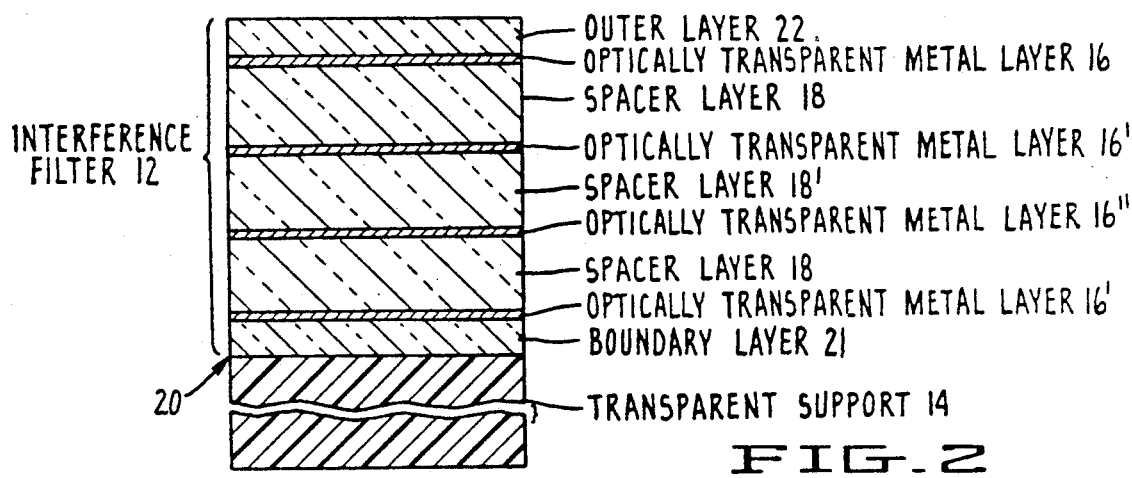
FIG_2
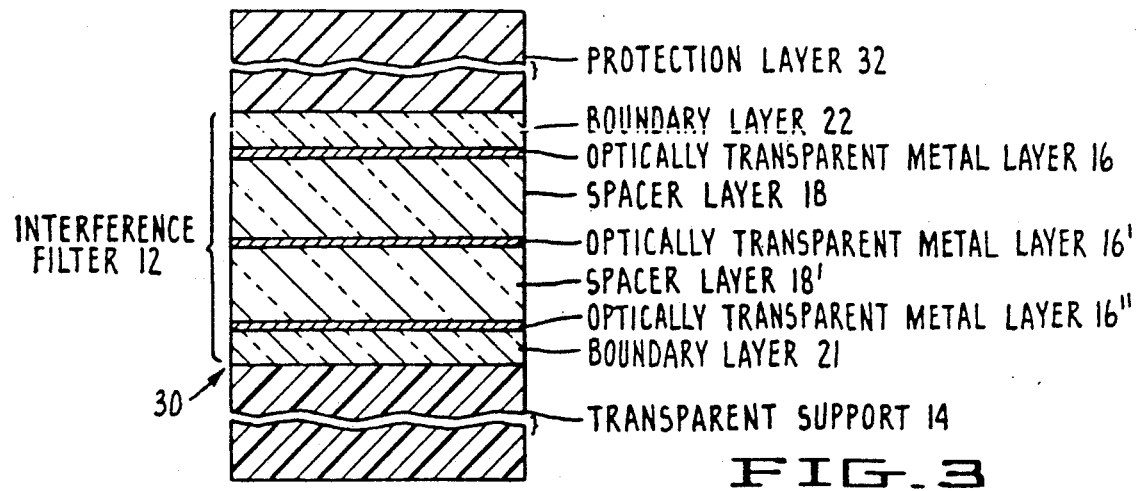
FIG_3

5,071,206

COLOR-CORRECTED HEAT-REFLECTING COMPOSITE FILMS AND GLAZING PRODUCTS CONTAINING THE SAME

CROSS-REFERENCE TO RELATED APPLICATION

This application is a continuation-in-part of U.S. patent application Ser. No. 880,797, filed June 30, 1986 now U.S. Pat. No. 4,799,745 issued 1/24/89.

BACKGROUND OF THE INVENTION

1. Field of the Invention

This invention relates to heat-reflecting films. More particularly, it relates to composite films comprising a series of dielectric and metal layers so as to create an infrared reflecting interference filter and to the use of such films in window glazing materials.

2. Description of the Prior Art

In the 1890s, Fabry and Perot developed an interferometer consisting of a pair of parallel-sided, half-silvered mirrors separated by a nonabsorbing layer. This device had the property of preferentially passing energy of certain wavelengths and reflecting energy of other wavelengths. An embodiment of this principle known as the Fabry-Perot sandwich consists of two more or less transparent metal layers separated by a dielectric spacer layer. (See, for example, Knittl, Zdenek, OPTICS OF THIN FILMS, John Wiley & Sons,Ltd., London, 1976, at page 284.) Other filter products known as "induced transmission filters" have been constructed of metal-dielectric sandwiches for use in window glazing structures. One such structure is described in U.S. Pat. No. 4,337,990 of Fan (July 6, 1982) as consisting of a transparent substrate, overlayered with a phase matching layer, a single metallic silver layer and an outer antireflection layer, with the three overlayers constituting a transparent heat reflector. While generally effective, products of this general structure suffer from the disadvantage that to achieve high levels of heat reflection they must have relatively thick metal layers such as 15 to 25 nm in thickness which tend to have low transmittances of visible radiation, as well.

Another system which used a Fabry-Perot approach to achieve heat reflection while transmitting visible radiation is shown in U.S. Pat. No. 3,682,528 of Apfel and Gelber (Aug. 8, 1972). In this system, thinner layers of metal are employed but it is taught that to obtain such layers of an optically suitable metal, in particular silver, it is necessary to first lay down a thin "nucleation" precoat layer of nickel by vacuum deposition and then apply the silver to it, again by vacuum deposition methods. It is further taught that the deposited silver must then receive a thin postcoat layer of vapor-deposited nickel if another layer is to be applied over it. These extra coatings with nickel are time consuming and economically unattractive. This patent also discloses a filter having two silver layers but shows that each silver layer must be accompanied by one or two nickel layers and suggests only durability advantages to this more involved structure. The substrate upon which this multilayer heat-reflecting film was constructed most commonly was glass.

It is also recognized that a wavelength selective filter can be achieved with a stack of alternating high/low index of refraction dielectrics. This would work but would require a large number of layers and be prohibitively expensive. This would not have the capability of low emissivity either.

In U.S. patent application Ser. No. 880,797, from which this application descends, we described the application of the Fabry-perot approach to glazing products. While as a general class these materials perform the task of heat rejection with admirable efficiency, in some settings they present a strong color cast to their reflection when viewed from the incident light direction. This strong color is often objected to by some consumers. It is an object of this invention to correct this failing in heat reflective glazings.

Another desired property of reflective glazing is that the appearance does not change as a function of viewing angle This absence of angle sensitivity has not been easily achievable with prior materials used in Fabry-Perot configurations.

In studying glazing materials employing these heat-reflecting filters we have discovered a number of configurations for plate glass and anti-lacerative glass which optimize the effectiveness of the filter systems and/or simplify their fabrication. These glass configurations find application in automotive and architectural settings. In some automotive settings, there is a desire to reflect as much heat as possible, but this must be done within the confines of various regulations setting light transmission limits and the like. For example, in the United States, automotive windshields must have a transmission of visible light of at least 70% at normal incidence. The present invention can serve these needs.

SUMMARY OF THE INVENTION

It is a general object of this invention to provide an improved Fabry-Perot interference filter sandwich which does not alter the color of light reflected from its surface and is thus relatively color neutral.

It is a further general object of this invention to provide an improved transparent Fabry-Perot filter stack which will selectively reflect heat, that is, infrared radiation, while giving high transmission of the visible wavelengths with a color-neutral appearance.

It is also an object to provide filter stacks which are designed to take into consideration the optical properties of the substrate (for example, glass or plastic) upon which they are deposited or to which they are laminated, and incorporate these substrates into an overall product having the desired wavelength selectivity, color neutrality and high visible transmission and uniform color reflection.

It is also an object in certain embodiments of this invention to provide a heat-reflecting, color-neutral transparent film which is plastic backed and has enhanced durability and scratch resistance.

It is an additional object to provide glazing structures incorporating these heat-reflecting, color-neutral filters and/or transparent films.

It is a further object of this invention to provide glass-filter composites which offer optimal heat-rejection characteristics.

It has now been found that these and and other related objects are achieved by employing in such films a Fabry-Perot filter incorporating three or more layers of transparent metal separated from one another by spacer layers of dielectric. In preferred embodiments, the spacer layers are sputter-deposited inorganic oxides.

Thus in one aspect this invention involves improved transparent, infrared reflecting composite films including a transparent metal layer-dielectric layer Fabry- Perot interference filter deposited on or adhered to a transparent support, wherein the improvement involves employing as the interference filter a multilayer stack including at least three separate discrete continuous transparent metal layers separated from one another by discrete continuous layers of dielectric.

In another aspect this invention involves visually transparent, color-corrected infrared reflecting composite films comprising a transparent support having adhered to one surface thereof two or more sequential interference filters each of the filters comprising a cavity defined by a continuous spacer layer of dielectric sandwiched between continuous discrete transparent metal layers.

In further aspects this invention involves methods of producing such films by sputter-deposit techniques.

This invention can be embodied in many forms. It can take the form of glass or plastic-supported sheets which may be interposed or laminated within or applied to transparent window glazing materials. It may take the form of a thin metal-dielectric multilayer sandwich film laid down directly onto a glazing material substrate. In such applications the films may contain additional layers such as hardcoats.

BRIEF DESCRIPTION OF THE INVENTION

Brief Description of the Drawings

In the drawings:

FIG. 1 and 1A are schematic cross-sectional views of a simple heat reflecting filter of this invention employing three transparent layers of metal with and without an outer layer, respectively;

FIG. 2 is a schematic cross-sectional view of a simple four-metal-layer heat reflector film of this invention;

FIG. 3 is a schematic cross-sectional view of a heat reflector film of this invention, such as shown in FIG. 1, having a physical protection layer covering its Fabry-Perot filter;

FIG. 6 is a schematic cross-sectional view of a product as shown in FIG. 5 additionally including an antilacerative plastic layer for use in windshields and the like.

DESCRIPTION OF PREFERRED EMBODIMENTS

Definitions

As used in this specification and the appended claims, the following terms have defined meanings:

"Visible radiation" or "light" means electromagnetic radiation having a wavelength of from 380 nanometers to 750 nanometers. (CIE Standard)

"Infrared radiation" or "heat" means electromagnetic radiation having a wavelength above 750 nanometers.

"Transparent" means having the property of transmitting visible radiation unless otherwise stated.

"Tvis" or "Tv" or "Transmittance visible" each refer to a measure of transmittance over the visible wavelength. It is an integrated term covering the area under the transmittance vs. wavelength curve throughout the visible wavelengths. (1931 CIE Illuminant C Standard). In automotive windshield glazing, Tvis should be 70% or greater.

"Tsol" or "Ts" or "Transmittance solar" each refer to a measure of transmittance over all solar energy wavelengths. (ASTM E 424A) It is an integrated term covering the area under the transmittance vs. wavelength curve for both visible and infrared wavelengths. In heat reflecting films and glazings incorporating them it is a primary goal to decrease Tsol while maintaining Tvis as high as possible.

"SC" or "Shading Coefficient" is an accepted term in the field of architecture. It relates the heat gain obtained when an environment is exposed to solar radiation through a given area of opening or glazing to the heat gain obtained through the same area of ⅛ inch single pane clear glass. (ASHRAE Standard Calculation Method) The clear glass is assigned a value of 1.00. An SC value below 1.00 indicates better heat rejection than single pane clear glass. A value above 1.00 would be worse than the baseline clear single pane. A similar term is "$R_{sol}$" or "reflectance, solar", which is measure of total reflectance over the solar energy wavelength.

"Transparent metal layers" are homogeneous coherent metallic layers composed of silver, gold, platinum, palladium, aluminum, copper or nickel and alloys thereof of a thickness which permits substantial tranparency.

"Sputter deposit" or "sputter-deposited" refers to the process or the product of the process in which a layer of material is laid down by the use of a magnetron sputterer.

"Dielectrics" are nonmetallic materials which are transparent to both visible and infrared radiation. Generally, these materials are inorganic oxides but other materials such as organic polymers may be included as well.

"Contiguous" has its usual meaning of being in actual contact, i.e. of being adjoining. From time to time the somewhat redundant term "directly contiguous" is used for emphasis or clarification and has an identical meaning.

Figure 1A:
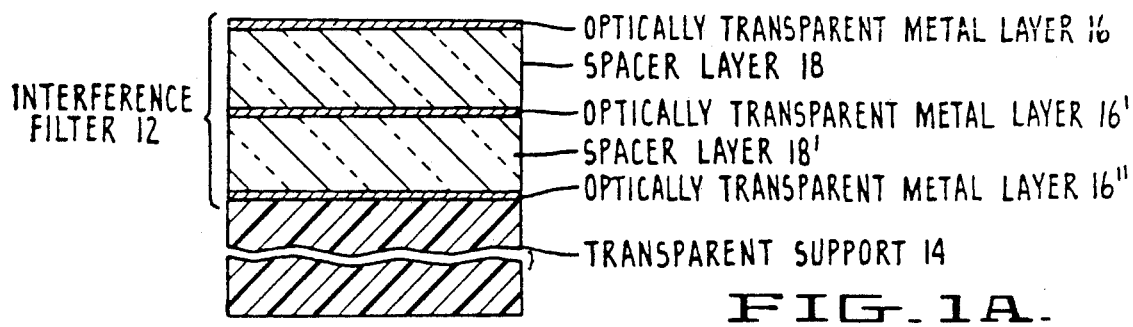

A "spacer layer" is a dielectric layer located between and contiguous with two transparent metal layers. In FIG. 1, 18 is a spacer layer.

A "boundary layer" is a layer contiguous with one and not two transparent metal layers. In FIG. 1, 21 is a boundary layer and 22 is an outer layer.

Description of Filters

The present invention involves heat reflecting filters. A basic embodiment of these filters is shown as film 10 in FIG. 1. Film 10 includes a multilayer interference filter 12 directly adhered to a transparent support 14. Filter 12 operates according to the Fabry-Perot principle and includes three transparent metal layers 16, 16' and 16" separated by spacer layers 18 and 18' and bonded by two outer or boundary layers 20 and 22. Thus, it presents two cavities between metal layers.

In preferred embodiments of this filter, the transparent metal layers are sputter-deposited. In addition, the spacer and boundary layers can be directly contiguous with the transparent metal layers. No nucleation layers are required when the transparent metal layers are sputter deposited. Nucleation layers may be present if desired.

As will be seen with reference to FIG. 2, more than three transparent metal layers such as 16, 16', 16" and 16''', each separated from one another by a spacer layer such as 18, 18' and 18" can be employed. In theory, there is no limit to the number of transparent metal layers that can be used in these sandwich filters. In practice, however three to five transparent metal layers are preferred, with three transparent metal layers being more preferred.

The thickness of the various layers in the filter should be controlled to achieve an optimum balance between desired infra-red reflectance and desired visible radiation transmittance. The ideal thicknesses can also depend upon the nature of the transparent metal and dielectric employed.

Each of the transparent metal layers 16, 16' and 16" is from about 4 to about 40 nanometers (nm) in thickness, with the total thickness of metal generally being from about 12 to about 80 nm. With silver and silver alloyed with up to about 25% w of gold, which constitute preferred transparent metals, excellent results are obtained with three or four layers of metal, each from 4 to 17 nm in thickness especially from about 5 to about 13 nm.

In FIG. 1 the three transparent metal layers are depicted as of equal thickness. This is not a requirement of the present invention. Best results have been achieved when the middle of the three metal layers is about 5% to 15%, especially 10% thicker than each of the outer layers.

The metal layers can be deposited by vapor deposition methods, electron-beam deposition, and the like. Magnetron sputtering is the preferred deposition method, but any methods which can deposit 100 nm layers with 10% accuracy in theory can be used.

The spacer layers 18 and 18' between the three transparent metal layers 16, 16' and 16" can be the same or different and are each between about 30 and about 200 nm in thickness. The preferred thicknesses selected within this range will depend upon the index of refraction of the dielectric employed. Index of refraction values can be from about 1.4 to 2.7. In a general relationship, thicker layers are called for with low index material while thinner layers are used with higher index material. Spacer layers are preferably from about 50 to about 110 nm and especially from about 70 to about 100 nm in thickness for dielectrics having an index of refraction of from about 1.75 to about 2.25. Materials having an index of refraction within this range include the inorganic dielectrics such as metallic and semimetallic oxides, for example zinc oxide, indium oxide, tin oxide, titanium dioxide, silicon oxide, silicon dioxide, bismuth oxide, chromium oxide, as well as other inorganic metal compounds and salts, for example zinc sulfide and magnesium fluoride and mixtures thereof. Of these materials, preference is given to zinc oxide, indium oxide, tin oxide and mixtures thereof and titanium dioxide.

With materials having indices of refraction in the 1.4 to 1.75 range, spacer thicknesses are somewhat thicker. Suitable thicknesses in this embodiment are from about 75 to about 200 nm with thicknesses from about 100 to about 175 nm being preferred. Materials having these indices of refraction include hydrocarbon and oxyhydrocarbon organic polymers (1.55-1.65 index of refraction) and fluorocarbon polymers (1.35-1.45 index of refraction).

With materials having indices of refraction in the 2.25 to 2.75 range, spacer thicknesses are somewhat thinner. Suitable thicknesses in this embodiment are from about 30 to about 90 nm with thicknesses from about 30 to about 80 nm being preferred. Materials having these indices of refraction include lead oxide, aluminum fluoride, bismuth oxide and zinc sulfide.

Other typical inorganic dielectrics and their indexes of refraction are listed in sources such as Musikant, *Optical Materials*, Marcel Dekker, New York, 1985, pp. 17-96, and may be used.

As will be described below, the inorganic metallic and semimetallic oxide dielectrics can be conveniently and preferably deposited by reactive sputtering techniques, although, if desired, chemical vapor deposit and other physical vapor deposition methods can be employed to apply the dielectric layers.

Filter 12 in FIG. 1 is depicted with two boundary layers 20 and 22. These layers provide physical protection to the metal layers beneath them and also serve to reduce visual reflections off of the metal surface to which they are contiguous. It is preferred to have a symmetric sandwich with boundary layers on both outside surfaces. This will give rise to a series of two or more sequential Fabry-Perot interference filters each of the filters comprising a continuous discrete sputter-deposited solar transparent metal layer directly sandwiched between continuous layers of dielectric.

However, if desired, one or both of the boundary layers can be omitted. The boundary layers can be the same or different dielectric and can be identical to or different than the dielectric making up the spacers. The same preferences for materials recited for the spacer apply to the boundary layers and, for simplicity, it is preferred if the boundary layers and the spacer layers are all made of the same materials and if they are all sputter-deposited.

The thicknesses of the boundary layers range from about 20 nm to about 150 nm. Boundary layers are preferably from about 25 to about 90 nm and especially from about 30 to about 70 nm in thickness for dielectrics having an index of refraction of from about 1.75 to about 2.25. With materials having indices of refraction in the 1.4 to 1.75 range, preferred thicknesses are from about 30 to about 140 nm and especially from about 45 to about 100 nm. If, as shown in FIG. 2, three or more transparent metal layers are employed, the boundary layers will remain substantially unchanged.

To sum up the geometry of the presently preferred filters, they have 7 layers arranged in a stack as follows Boundary dielectric
Metal layer I
Spacer layer I
Metal layer II
Spacer layer II
Metal layer III
Boundary dielectric In this preferred configuration the three metal layers are preferably silver and total from 25 to 35 nm in thickness with metal layer II being 110%±5% of the metal layers I or III. The boundary layers and spacer layers are preferably indium oxide with boundary layer thicknesses of from 30 to 40 nm and spacer thicknesses of from 60 to 80 nm.

Supporting the Filter

In each of FIGS. 1 through 6, the Fabry-Perot type filter is shown directly adhered to a transparent support 14. This support is shown in section because it is many times as thick as the filter. This thick support is essential to the practice of this invention. The filter itself is at most only a few hundred nanometers thick and thus can have only minimal physical strength without the added support. Support 14 can be selected from among the rigid and nonrigid but minimally stretchable transparent solids which can withstand the conditions of sputter deposition. Glass, both float or plate glass and laminated glass and especially low iron float glass, and rigid plastics, such as poly(carbonate) and poly(acrylate) in thicknesses from about 50 mils to about 5 cm or more are representative examples of rigid supports. Poly(ester)s including poly(ethylene terphthalate) and other terphthalate ester polymers, poly(urethanes), cellulose ester polymers, acrylic polymers, and poly(vinyl fluoride)s from about 1 or 2 mils to about 50 mils in thickness are representative examples of nonrigid, minimally stretchable films which may be employed. Poly(esters) and in particular poly(ethylene terphthalates) such as the duPont "Mylars" are a preferred group of film supports.

The filter 12 is directly adhered to the support 14. This can be carried out by sequentially applying the various layers of the filter directly to the support. If the layers are applied by sputter deposition, this can involve first sputter depositing a boundary layer, then a transparent metal layer, a spacer layer, etc.

The macroscale transparent layers, be they a plastic or glass transparent support or an additional component (such as a glass layer laminated to a plastic supported film), do contribute to the performance and visual optics of the final product as will be shown in the examples.

Optical Properties

Figure 14:
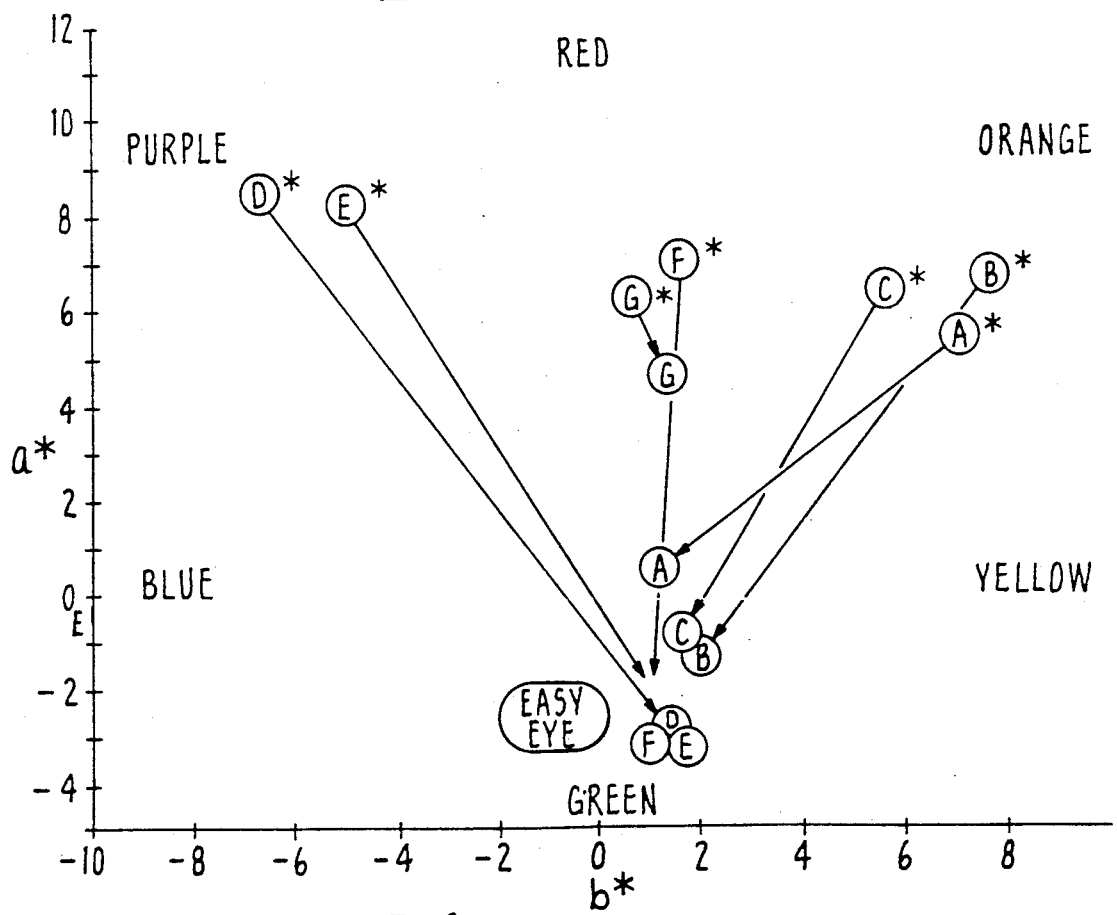
FIG. 14 is a color coordinant chart showing the color properties of filters of this invention using the CIE L*a*b* system.

In some settings, the desired optical properties include maximum rejection (reflection) of heat (infrared wavelengths) with only less attention being paid to the amount of visible light transmitted or reflected. In other applications specific degrees of visible light transmittance must be attained to meet government regulations, for example, in auto windshields the Tvis must be 70% or greater. FIG. 14 illustrates an idealized reflectance curve for such a product. In this product, reflectance is flat at 30% at all wavelengths between 350 nm and 700 nm. This means that the reflectance off of this product would be neutral in color without the strong tint that can be found objectionable. In this idealized product, the reflectance would be 100% at the wavelengths outside the visible range to achieve maximum thermal rejection.

As previously noted, the present invention permits one to control the color of reflectance off of the filter. In many cases the property is used to attain color neutrality. With colored light this means a colored reflection or with white light a neutral reflection. This feature can be quantitated by the CIE L*a*b* 1976 color coordinate system, in particular the ASTM 308-85 method.

Using the L*a*b* system the property is shown by values for a* and b* near O for example a* from −4 to +1 and b* from −2 to +2 when using an Illuminant A light source. FIG. 14 is a L*a*b* color coordinant chart which shows the desired color coordinates and defines the desired color space.

Figure 13:
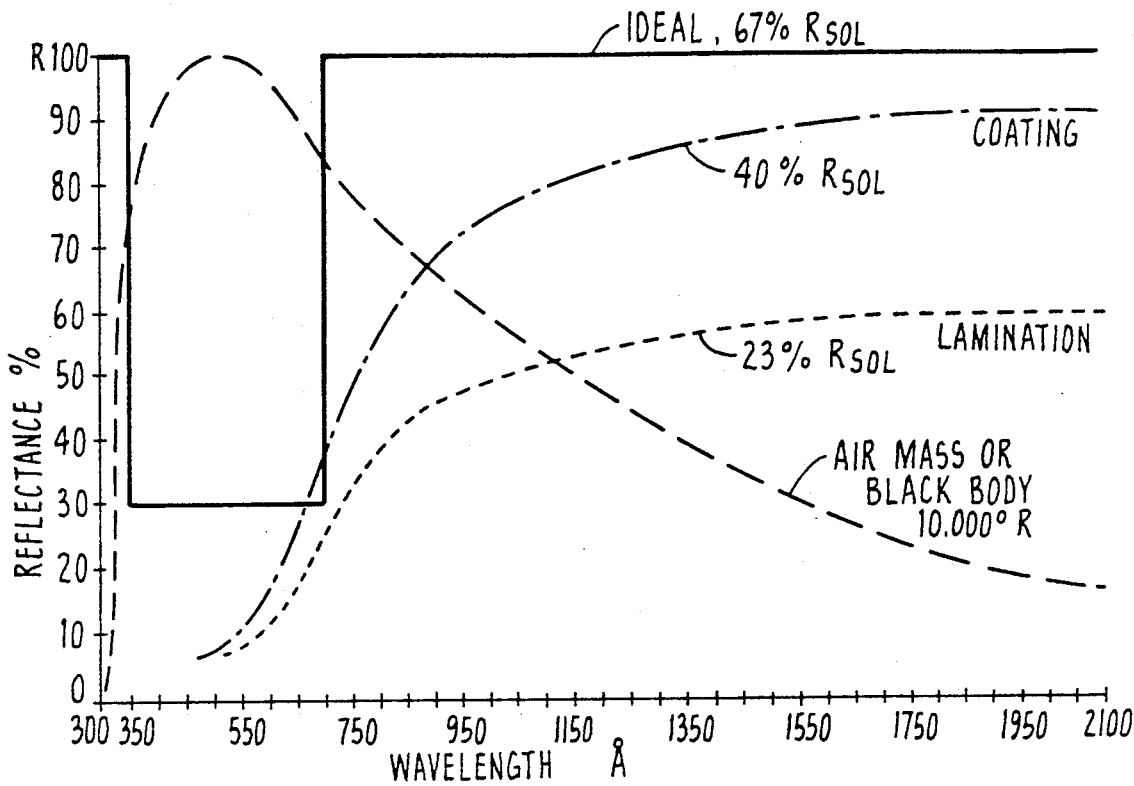
FIG. 13 is a graph illustrating an ideal coating spectrum.

This neutral color can also be illustrated by the shape of the absorbance/reflectance vs. wavelength curve and comparing it with a typical ideal curve such as shown in FIG. 13 which is described above.

In general, it will be observed that when the multimetal layer films of this invention are laminated to or between glass and/or plastic layers the overall optical properties are different than the properties observed with the unlaminated films. One achieves optical properties approaching the optimum in ways not easily achieved by less complicated filter stacks. In particular, one can achieve filter products having high Tvis/Tsol selectivity, neutral color, excellent heat rejection, high Tvis, high Rsol and an emissivity of less than 0.1.

Incorporation into Glazing Structures

As may be seen by referring to FIGS. 3 through 9, the multi-metal layer films of this invention may, if desired, contain a number of optional layers and may be incorporated into a great variety of glazing structures for architectural and transportation system uses. In FIG. 3 a film 30 is shown containing an optional protection layer 32 over filter 12, This layer 32 can typically be a hardcoat, such as a silicon-containing coating which is applied as a liquid and thereafter cured with heat and/or plasma or corona discharge to yield a hard scratch-resistant overcoating. Typical hardcoats are the cured products resulting from heat or plasma treatment of a.) a hydrolysis and condensation product of methyltriethoxysilane; b.) mixtures of poly(silicic acid) and copolymers of fluorinated monomers with compounds containing primary and secondary alcohol groups as described in U.S. Pat. Nos. 3,429,845 and 3,429,845, respectively. Other hardcoat layers are described in U.S. Pat. Nos. 3,390,203; 3,514,425; and 3,546,318. These hardcoat layers have thicknesses in the range of a few to a few hundred microns.

Figure 4:
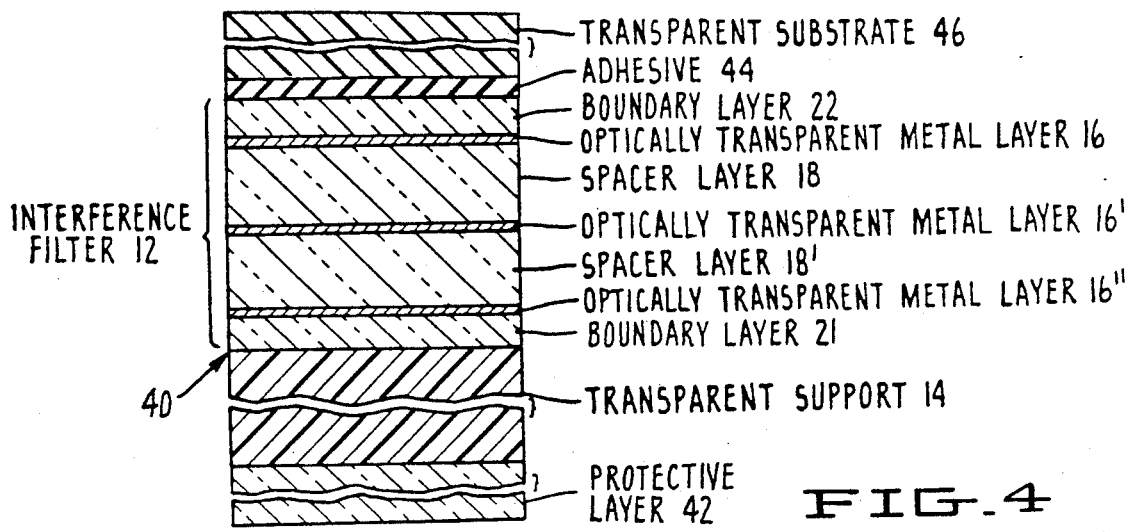
FIG. 4 is a schematic cross-sectional view of a heat reflector film of this invention, such as shown in FIG. 1, having an optional hardcoat layer on its transparent support and adhered to an additional transparent substrate via its filter layer stack which could serve as window glazing.

In FIG. 4, a preferred configuration 40 for employing the films of this invention is depicted. In this embodiment, the filter 12 is deposited on a support 14 as already described. When the support 14 is a flexible plastic it can carry a previously applied hardcoat 42 for scratch resistance. The filter side of the film is then adhered to a transparent substrate 46 such as another film of flexible plastic or a layer of glass or rigid plastic, or the like using an optically acceptable adhesive 44 such as poly(vinyl butyral), ionomer resin, poly(urethane) resin, or polyvinyl chloride resin. Although not wishing to be limited to a particular adhesive, preference is given to the commonly used glass adhesive, poly(vinyl butyral).

The configuration shown in FIG. 4 is of special interest in areas where the film comprises a filter 12 supported on plastic sheet 14 and this is applied to a surface such as the inside surface of a sheet of glass or other rigid material. This can be used as architectural glass, as automotive windshields (when the glass is a suitable tempered or laminated safety glass), automotive side or rear window glass (again with proper tempering, etc), as aircraft canopies, and the like. In these applications, the substrate 46 is the "outside" surface and support 14 can, if desired, be selected to provide antilacerative properties to the resulting final product, as is disclosed in U.S. Pat. No. 3,900,673 which is incorporated herein by reference both for its teachings of antilacerative coatings and for its teachings of the fabrication of safety glass structures.

Figure 5:
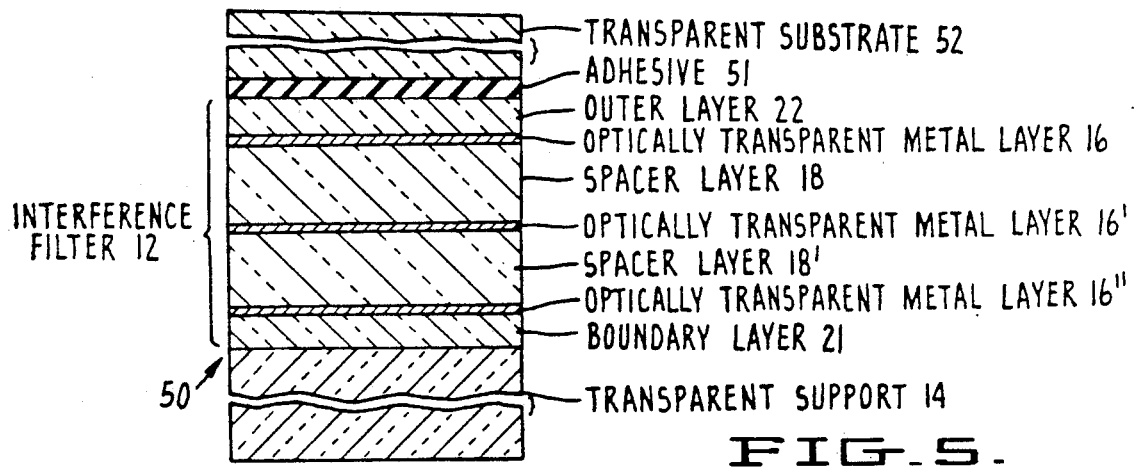
FIG. 5 is a schematic cross-sectional view of a filter as shown in FIG. 1 interposed between two rigid substrates such as glass.

FIG. 5 shows a variation 50 of the product of FIG. 1. Embodiment 50 includes a filter 12 deposited on support 14 as previously described and this combination is attached via adhesive 51 to additional transparent layer 52. If layers 14 and 52 are both glass a very durable product results.

Figure 6:
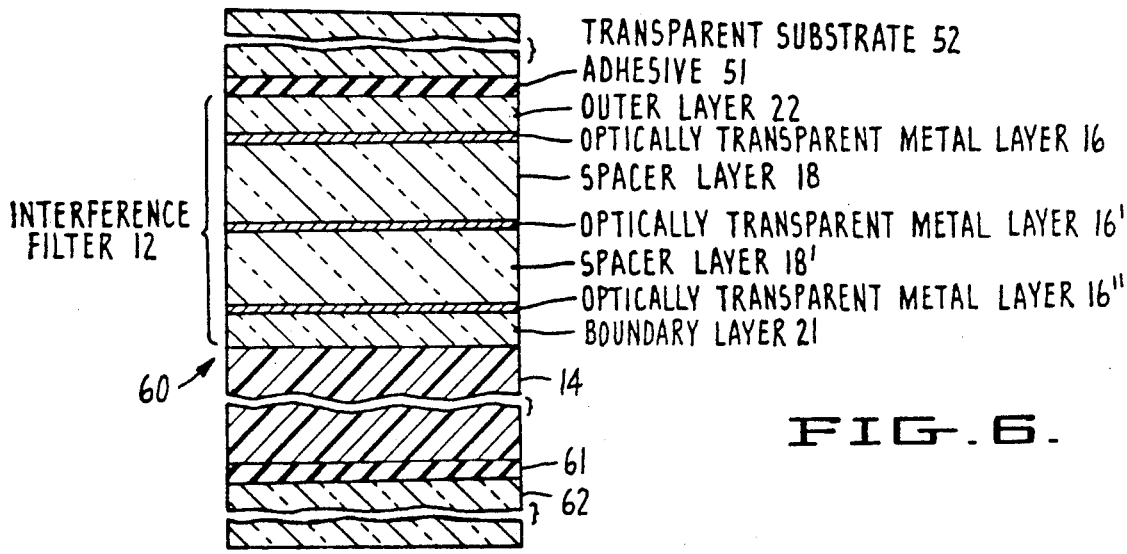

FIG. 6 depicts a variation 60 of the product of FIG. 5 in which layers 14 and 52 are both glass. Embodiment 60 includes an antilacerative coating 62 adhered to the inside surface of support 14 with adhesive layer 61.

Figure 7:
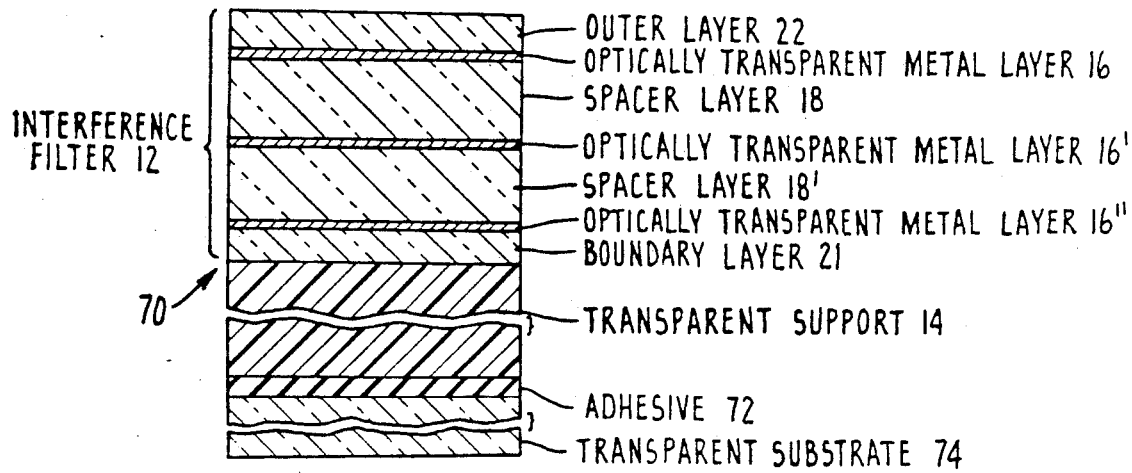
FIG. 7 is a schematic cross-sectional view of a film such as shown in FIG. 1 adhered to an additional transparent substrate via its support layer. This too could serve as window glazing.

Turning to FIG. 7, another embodiment 70 of the invention is depicted in which the film is adhered to a transparent substrate 72 with an adhesive 71, this time through the transparent support 14. This embodiment has the disadvantage that the filter 12 is potentially physically accessible so that it can be physically damaged if great care is not taken. This can of course be corrected by placing this surface in the interior of a double pane glass unit, or by providing other suitable protection.

Figure 8:
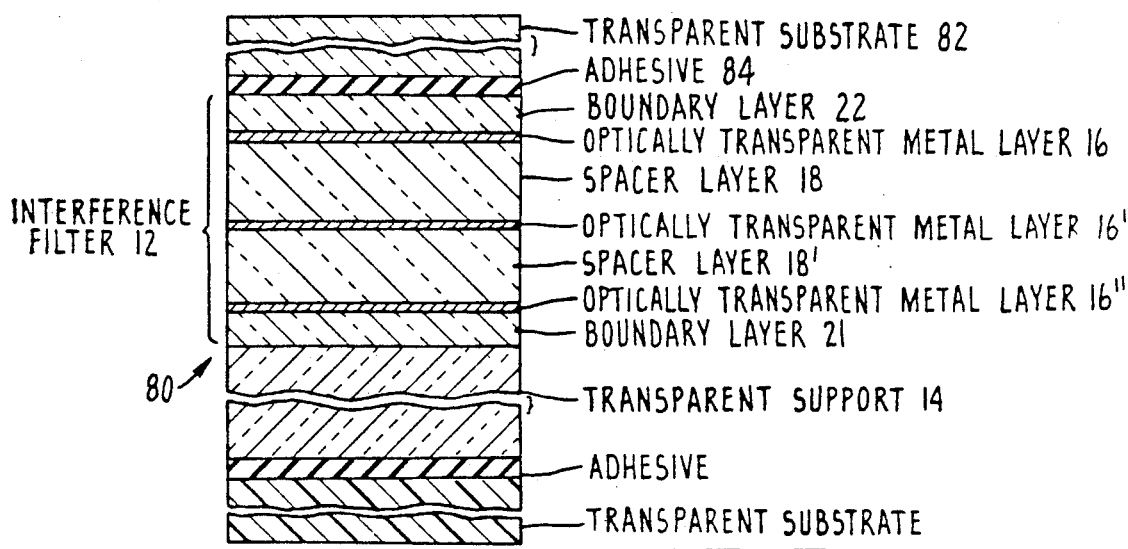
FIG. 8 is a cross-sectional view of a laminated window glazing in which a film of the invention is laminated between two sheets of transparent substrate.

FIG. 8 shows yet another embodiment 80. This embodiment 80 includes filter 12 deposited on transparent support (e.g., plastic film) 14. The filter and support are then laminated between two transparent substrates 81 and 82 using adhesive layers 83 and 84, respectively. This configuration has the advantage, when 81 and 82 are glass, of presenting two glass surfaces.

An unexpected advantage of the films of the present invention which employ multiple transparent metal layers is their superior efficiency when laminated to a transparent substrate in the configurations shown in FIGS. 4, 5, 6, 7 or 8.

Figure 9A:
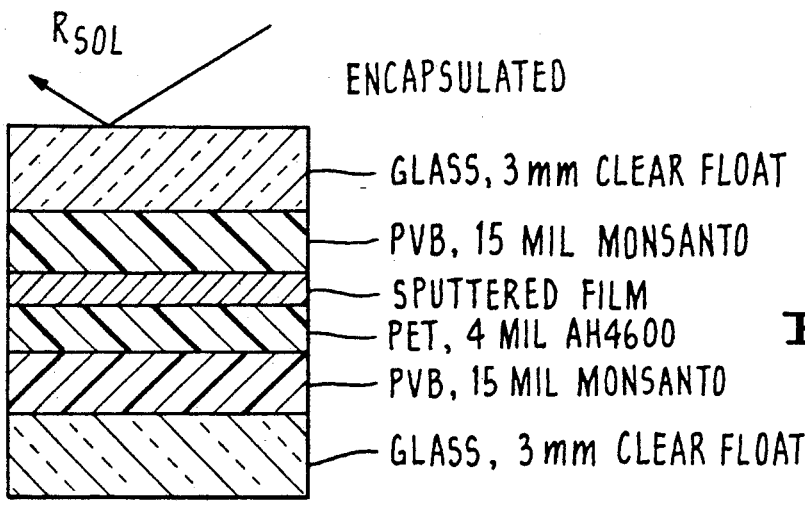
FIGS. 9a, b and c are three cross-sectional views illustrating three film materials prepared in the Example.

In these configurations, the multiple transparent metal layer filters of this invention offer special advantages and efficiencies. When a transparent support-backed single metal layer sandwich filter (i.e. an induced transmission filter) is laminated directly to a second sheet of transparent substrate to give a support-filter-substrate configuration, the filter undergoes a pronounced drop in efficiency. FIG. 9 illustrates that for a single metal layer filter this drop in efficiency is quite pronounced.

Figure 10:
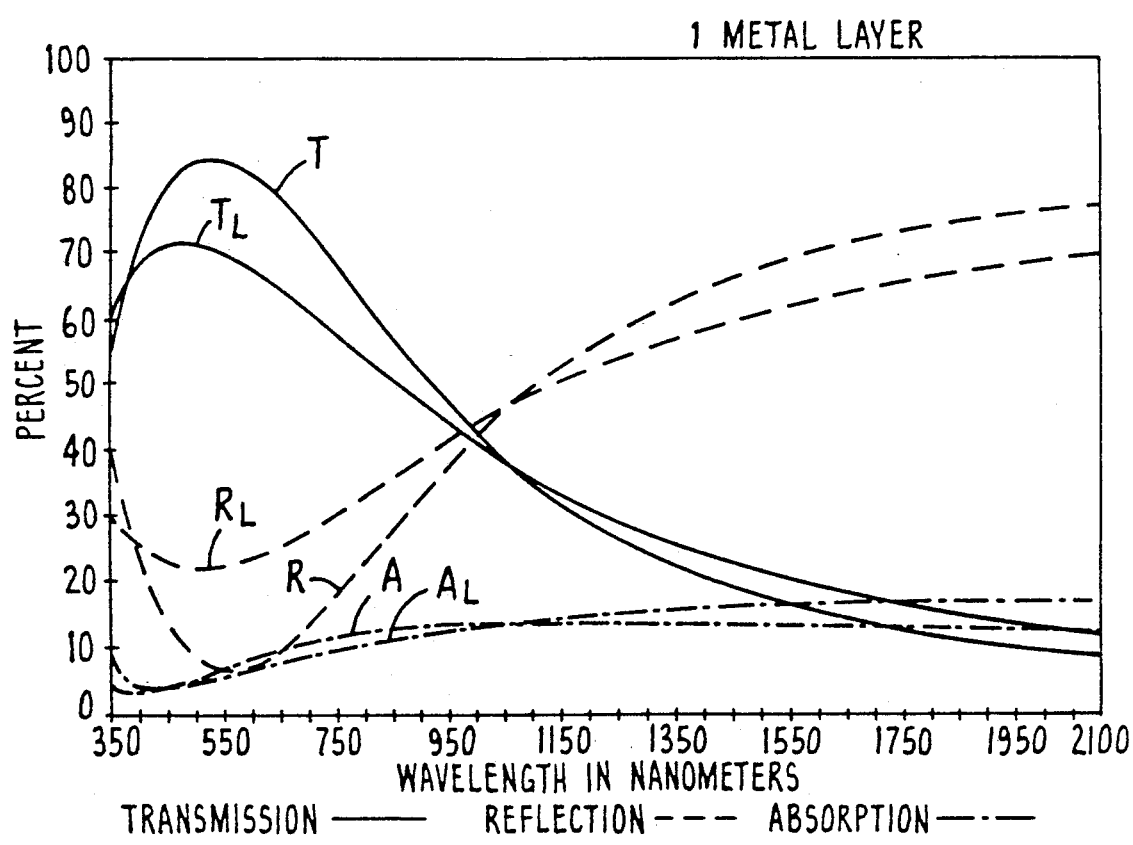
FIG. 10 is a graph illustrating for comparison purposes the performance of a prior art reflecting film.

FIG. 10 depicts the transmission and reflectance of visible and infra-red wavelengths by a one metal layer filter with and without lamination to a second transparent layer. In the case shown, this second layer is a second layer of plastic support. By difference, the energy absorbed by this filter with and without lamination is shown as well. Line T is the transmittance curve for the unlaminated film. $T_L$ is the transmittance curve for the laminated film. R and $R_L$ are the reflectance curves. A and AL are the absorption curves before and after lamination respectively. This filter has a 4 mil poly(ethylene terphthalate) (PET) backing having a directly deposited 46 nm thick tin-indium mixed oxide dielectric boundary layer; an 11.8 nm thick layer of sputter-deposited silver topped with another 46 nm thick tin-indium oxide boundary layer. The layer to which this film is laminated is a second sheet of the PET.

As can be seen, the lamination causes transmittance in the visible region to drop markedly while substantially increasing transmittance of energy in the infra-red region. The Tvis value for the filter drops from 82% to 70% when it is laminated. As the same time Tsol only drops from 62% to 55%. This illustrates that the filter is not preferentially passing visible wavelengths with the efficiency it did before lamination. This film when laminated provides a Shading Coefficient of 0.67. This is little better than conventional green-tinted glass.

Figure 11:
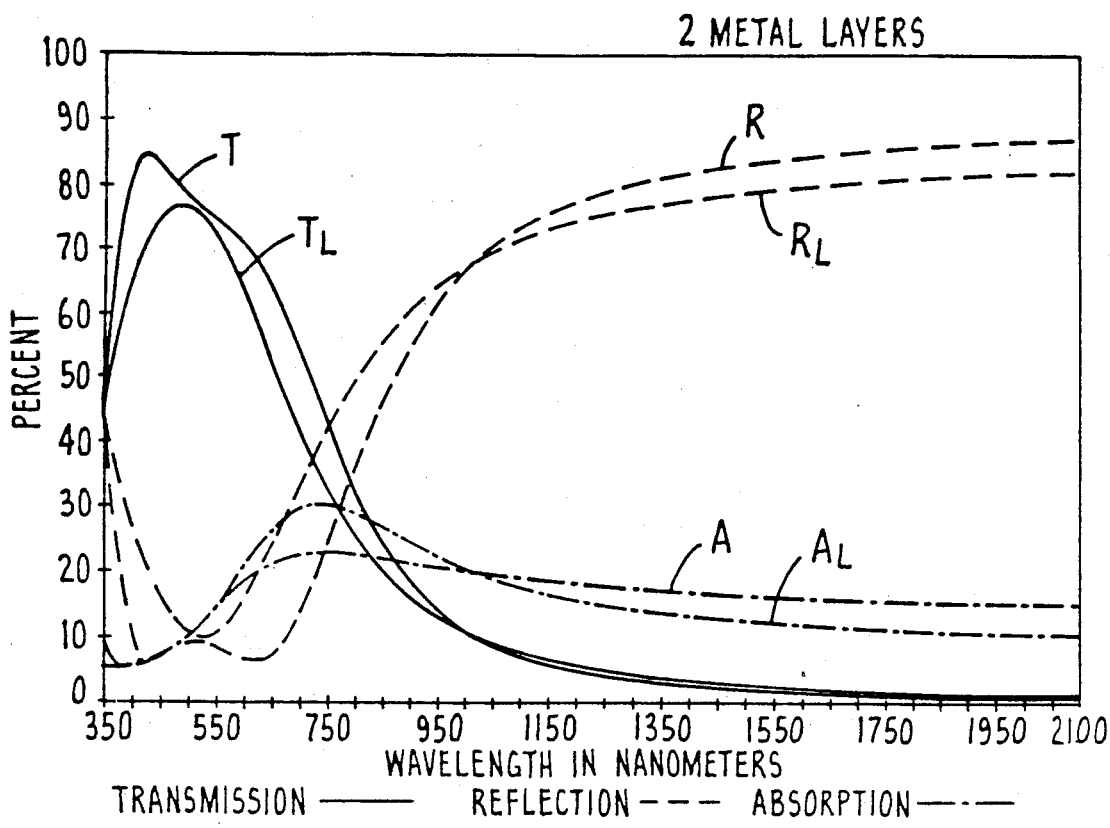
FIG. 11 is a graph illustrating the performance of a reflecting film having two transparent metal layers.

Turning to FIG. 11, comparable curves are presented for a filter of the invention having two metal layers. This filter uses the same materials and the same lamination layer used in the filter characterized in FIG. 8. The filter layers are 35 nm of dielectric, 10.7 nm of silver, 75 nm of dielectric, 10.7 nm of silver and 40 nm of dielectric. The curves are identified as in FIG. 10. One advantage is clear from the curves. In the infra-red region, this filter is much more efficient and does not change appreciably when laminated. When Tvis and Tsol and SC values are determined it is seen that the drop in Tvis is much less pronounced and in fact, relatively less or the same than the drop in Tsol. (Tvis went from 76% to 70%. Tsol went from 45% to 40%.) The SC value for the laminated material is a superior 0.53.

Figure 12:
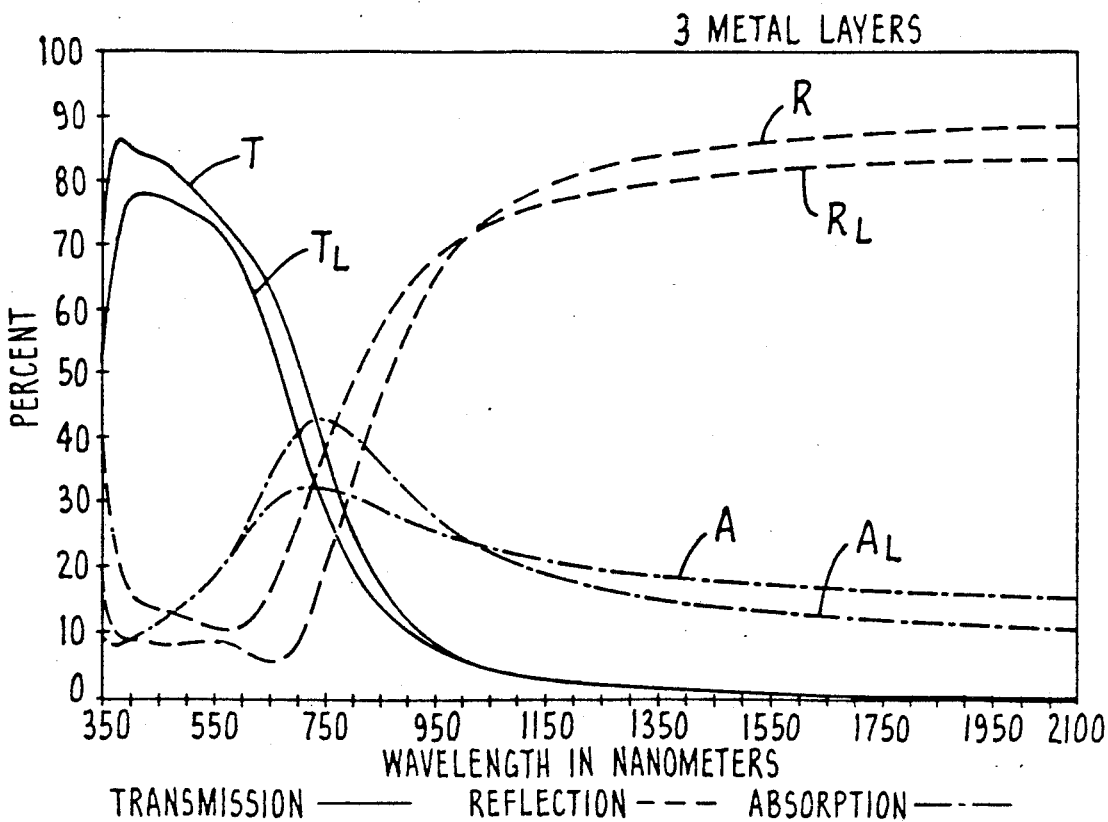
FIG. 12 is a graph illustrating the improved performance of a reflecting film of this invention having three transparent metal layers.

In FIG. 12 the same data are presented for a filter of this invention having three sputter-deposited transparent metal layers. This filter uses the same materials used in the filters characterized in FIGS. 10 and 9 in a 35 nm dielectric / 7 nm silver / 65 nm dielectric / 10 nm silver / 70 nm dielectric / 9 nm silver / 35 nm dielectric structure. With this filter, the drop in Tvis is relatively less than the drop in Tsol so that the efficiency of the filter was substantially unchanged by lamination. (Tvis went from 74% to 70% and Tsol went from 42% to 38%.)

Methods of Preparation

The films of this invention are prepared by laying down a series of uniform continuous layers of metal and dielectric in sequence on a support. The metal layers are laid down using magnetron sputtering. This technique can also be used to lay down the dielectric layers if they are of the inorganic oxide type which is preferred. Importantly, this technique can achieve the desired direct contiguous deposit of the various layers upon one another and upon the support layer without resort to nucleation layers and the like.

This technique and apparatus suitable for carrying out the production of the present materials are both described in detail in U.S. Pat. No. 4,204,942 of Charroudi (May 27, 1980) which for brevity is incorporated herein by reference.

Chemical coating or vapor deposition can be used to deposit the dielectric materials but are not preferred. If these methods are used, conventional techniques of thermal evaporation, electron beam evaporation and chemical vapor deposition and the like known to those of skill in the art will be employed.

EXAMPLES

Seven multilayer filter stacks were prepared on plastic substrates. For purposes of the example they were denominated samples A-G. These materials were then adhered to glass layers or laminated between glass layers. In some cases the final products were designed to have anti-lacerative properties.

Design Materials

Substrate

Substrate poly(ethylene terphthalate) (ICI 393, 4 mil) with a clear polysiloxane hardcoat was used for the anti-lacerative coatings, coated on the non-hardcoat side. Four mils was used to achieve anti-lacerative properties. ICI 393 was selected because it maximized the adhesion of hardcoat. Encapsulated coatings were made on a different (no hardcoat) 4 mil polyester (American Hoecst 4600). Encapsulated anti-lacerative samples were made by laminating an uncoated piece of ICI 393 onto an encapsulated sample.

Glass 3 mm clear float glass was used for all laminations. In several later repeats, low iron glass laminations were prepared which showed several percentage points improvement in $R_{sol}$.

Adhesive 15 mil and 30 mil Monsanto PVB were used for all sputtered film laminations for which data are presented. 15 mil and 30 mil DuPont PVB was examined and found to be optically similar. The transmission spectra of laminations without sputtered coatings was measured to determine the variability of absorption with lamination temperature. Laminations were made at 280° F. and 300° F.

Sputtered Coating

Indium oxide and silver were used as dielectric and metal respectively. The coatings were laid down in a magnetic sputtering apparatus.

The thickness of the filter layers in samples A-G was as shown in Table 1.

TABLE 1

| | Layer, thickness, nm | | | | | | |
|---|---|---|---|---|---|---|---|
| | | | | Layer | | | |
| Sample | $D_1$ | $M_1$ | $D_2$ | $M_2$ | $D_3$ | $M_3$ | $D_4$ |
| A | 35 | 10 | 70 | 11 | 70 | 10 | 35 |
| B | 33 | 10 | 67 | 11 | 67 | 10 | 33 |
| C | 31 | 10 | 63 | 11 | 63 | 10 | 31 |
| (all prepared with hardcoated substrate) | | | | | | | |
| D | 35 | 10 | 70 | 11 | 70 | 10 | 35 |
| E | 33 | 10 | 66 | 11 | 66 | 10 | 33 |
| F | 31 | 10 | 62 | 11 | 62 | 10 | 31 |
| G | 29 | 10 | 58 | 11 | 58 | 10 | 29 |
| (all prepared without hardcoat on substrate) | | | | | | | |

$D_1$ = dielectric 1
$M_1$ = metal 1, etc.

Figure 9B:
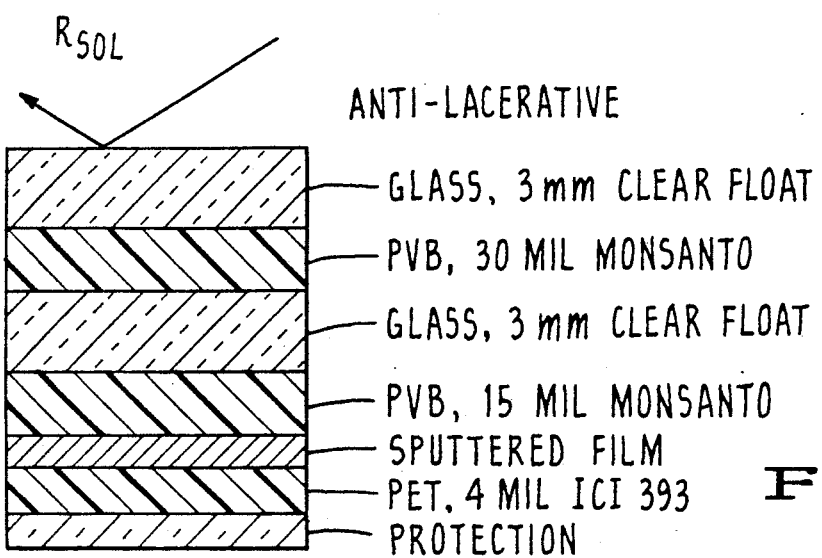
Figure 9C:
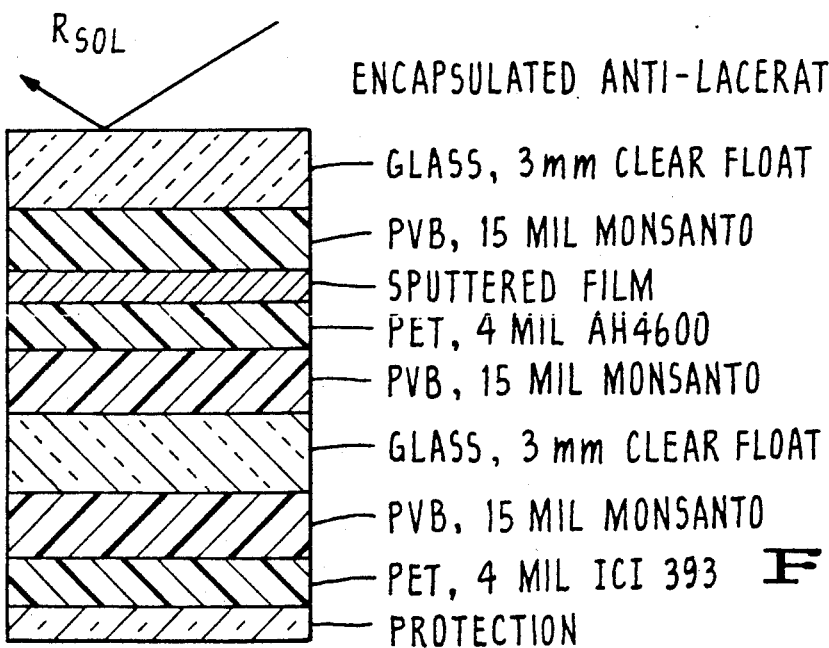

These seven filter stacks were then incorporated into glazing structures as shown in FIG. 9. A, B and C were laminated into structures as shown in FIG. 9B. D, E, F and G were made up into 9A and 9C type structures.

In addition to these samples, three comparative samples of three composite laminates were provided. One was a glass / 30 ml PVB / glass composite that had no sputtered filter coating and was intended to simulate current laminated windshields. The second was a anti-lacerative version like 9B, different only in having no sputtered film. The third was a sample of "Easy-Eye" brand, absorbing glass made up into a glass/PVB/glass geometry. These samples were also measured.

Visible transmission and reflection values were measured on a Spectrogard using Illuminant "A" for the A-G materials with and without lamination and for the three comparative materials.

Observations

The results of the color measurements are given in Table 2. These results show that Tvis values of greater than 70% can be achieved with very good color reflection using the present invention.

TABLE 2

| | | | Color Properties | | |
|---|---|---|---|---|---|
| Sample | Tvis, % | Rsol, % | L | a* | b* |
| A | 73.8 | 24.1 | 33.04 | 0.55 | 1.16 |
| B | 71.8 | 23.3 | 33.15 | −1.19 | 1.87 |
| C | 72.8 | 23.5 | 33.27 | −1.11 | 1.65 |
| A* | 72.6 | 36.7 | 33.25 | 5.47 | 6.72 |
| B* | 71.5 | 35.4 | 34.59 | 6.86 | 7.29 |
| C* | 70.3 | 37.0 | 33.6 | 6.45 | 5.44 |
| D | 73.0 | 29.3 | 34.61 | −3.28 | 1.42 |
| E | 71.5 | 29.8 | 34.57 | −3.26 | 1.0 |
| F | 71.9 | 29.9 | 33.34 | −3.11 | 1.1 |
| G | 71.9 | 32.1 | 34.36 | +4.81 | 1.12 |
| D* | 76.5 | | 33.82 | 8.44 | −6.9 |
| E* | 75.9 | | 34.68 | 8.27 | −5.11 |
| F* | 75.6 | | 36.6 | 6.96 | 1.56 |
| G* | 74.9 | 37.6 | 36.84 | 6.19 | 0.12 |
| Encapsulated | 84.0 | 7.1 | 33.46 | −.82 | −0.36 |
| Antilacerative | 83.7 | 8.5 | 34.76 | −2.05 | −3.08 |
| Easy Eye | 75.4 | 6.0 | 31.98 | −2.62 | −1.05 |

*Before lamination

These results also showed that the lamination of the films of this invention into composites gave improved color performance. Materials which were not acceptable from a color point of view before lamination were acceptable thereafter. The color properties are also shown in color charts such as FIG. 14.

FIG. 14 shows an L*a*b* color coordinate system and shows the general colors it represents together with the a* and b* values for materials of this invention before and after lamination as taken from Table 1. As can be seen, the color properties became more neutral with lamination.

Additionally, when the reflection off of materials of this invention was inspected at a variety of angles, the materials were observed to have minimal angle sensitivity. That is, the color of the reflection did not change with the angle.

Although this invention has been described with reference to certain preferred embodiments, these are not to be construed as limitations upon the invention's scope which is as defined by the following claims:

What is claimed is:

1. A glazing material comprising a visible light transparent structural sheet member having two sides and a surrounding edge, said sheet member having adhered to one of its sides a color-corrected infrared-reflecting Fabry-Perot interference filter composite, said composite itself comprising a seven layer structure made up of the following sequential layers;

a discrete continuous visible light transparent dielectric boundary layer;

a discrete continuous visible light transparent metal layer;

a discrete continuous visible light transparent dielectric spacer layer;

a discrete continuous visible light transparent metal layer;

a discrete continuous visible light transparent dielectric spacer layer;

a discrete continuous visible light transparent metal layer; and a discrete continuous visible light transparent dielectric outer layer;

wherein the metal layers each comprise silver and each are from 4 to 17 nm in thickness and the dielectric layers each have an index of refraction of from about 1.75 to about 2.25 with the spacer layers having a thickness of from 70 to 100 nm and the boundary and outer layers each having a thickness of from about 30 nm to about 70 nm.

2. The glazing material of claim 1 wherein there are three metal layers each from 5 to 10 nm in thickness.

3. The glazing material of claim 2 additionally comprising a hardcoat layer or laminated glass layer located over the outer layer of the composite.

4. The glazing material of claim 1 wherein the sheet member is glass and wherein the composite is directly adhered to the surface of the glass.

5. The glazing material of claim 1 wherein the sheet member is plastic sheet, wherein the composite is directly adhered to the surface of that plastic sheet and wherein the glazing material is adhered to a visible light transparent substrate comprising glass.

6. The glazing material of claim 5 wherein the plastic sheet is adhered to the visible light transparent substrate on the side not having the composite adhered thereto.

7. The glazing material of claim 5 adhered to the visible light transparent substrate on the side having the composite adhered thereto.

8. A window glazing product comprising the glazing material of claim 1 wherein the sheet member is plastic sheet, wherein the composite is adhered to the surface of the plastic and wherein the glazing material is laminated between two parallel sheets of plastic or glass.

9. The window glazing product of claim 8 wherein the parallel sheets are low iron glass.

10. The glazing material of claim 1 wherein the metal and dielectric layers are each sputter-deposited.

11. The glazing material of claim 1 wherein the sheet member comprises plastic.

12. The glazing material of claim 1 wherein the sheet member comprises glass.

* * * * *